(12) United States Patent
Omura

(10) Patent No.: US 8,850,740 B2
(45) Date of Patent: Oct. 7, 2014

(54) FISHING ROD

(75) Inventor: Kazuhito Omura, Shizuoka (JP)

(73) Assignee: Fuji Kogyo Co., Ltd., Shizuoka-Shi, Shizuoka-Ken (JP)

( * ) Notice: Subject to any disclaimer, the term of this patent is extended or adjusted under 35 U.S.C. 154(b) by 400 days.

(21) Appl. No.: 13/455,201

(22) Filed: Apr. 25, 2012

(65) Prior Publication Data

US 2012/0272562 A1    Nov. 1, 2012

(30) Foreign Application Priority Data

Apr. 26, 2011    (JP) .................................. 2011-098462

(51) Int. Cl.
*A01K 87/04*    (2006.01)
(52) U.S. Cl.
CPC ..................................... *A01K 87/04* (2013.01)
USPC ............................................................ 43/24
(58) Field of Classification Search
CPC ...................................................... A01K 87/04
USPC ................................ 43/24, 18.1 R
See application file for complete search history.

(56) References Cited

U.S. PATENT DOCUMENTS

| 5,713,151 | A * | 2/1998 | Matumoto | 43/18.1 HR |
| 6,378,240 | B1 * | 4/2002 | Ohmura | 43/24 |
| 2008/0005953 | A1 * | 1/2008 | Anderson | 43/24 |
| 2009/0320352 | A1 * | 12/2009 | Underwood | 43/24 |
| 2011/0289818 | A1 * | 12/2011 | Hannon | 43/24 |

FOREIGN PATENT DOCUMENTS

JP    8-294344 A    11/1996

* cited by examiner

*Primary Examiner* — Kimberly Berona
(74) *Attorney, Agent, or Firm* — Bacon & Thomas, PLLC

(57) ABSTRACT

A fishing rod has a rod blank, and a line guide group attached to the rod blank for guiding a fishing line delivered from a reel to a top guide. The, line guide group is classified into a choke guide group configured with three choke guides and a tip guide group configured with a plurality of tip guides having a decreased height and diameter than the choke guides. Heights and diameters of the choke guides are set to draw one virtual cone shape in which the diameters are made to be circumferences. The heights and diameters of the tip guides are set to be all the same. Since the line is converged rapidly and smoothly, the tip guide group can have a combination of light guides having small diameter, thereby the entire weight can be saved greatly, and original ability of a rod can be brought out.

3 Claims, 10 Drawing Sheets

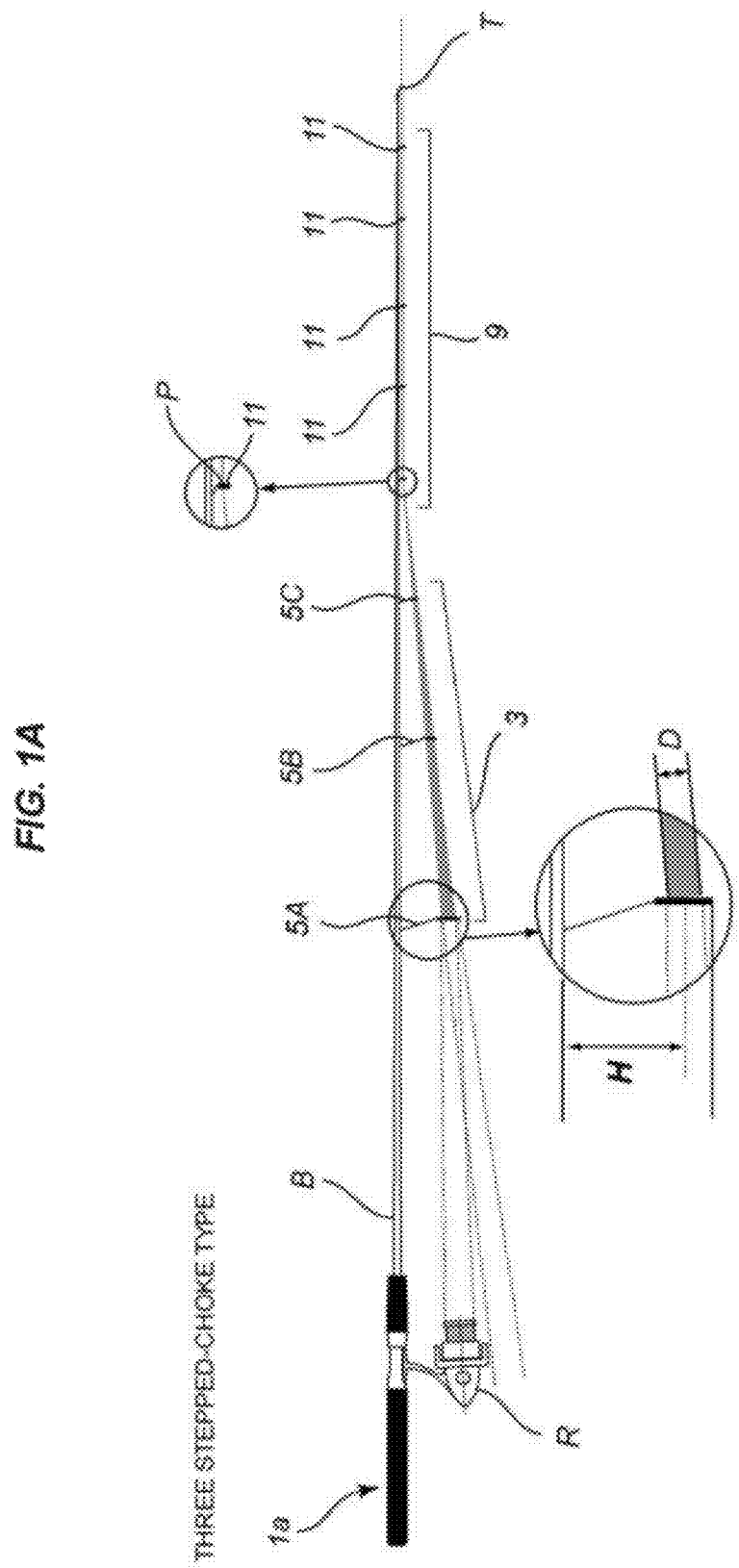

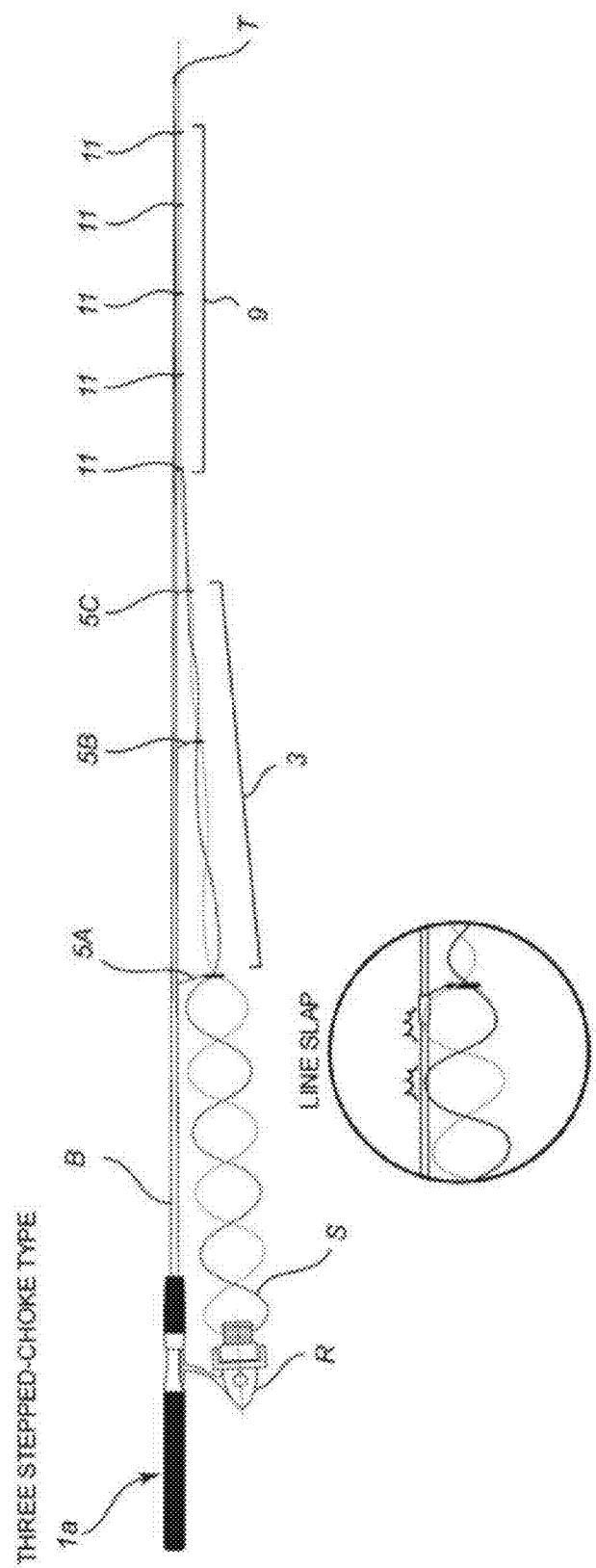

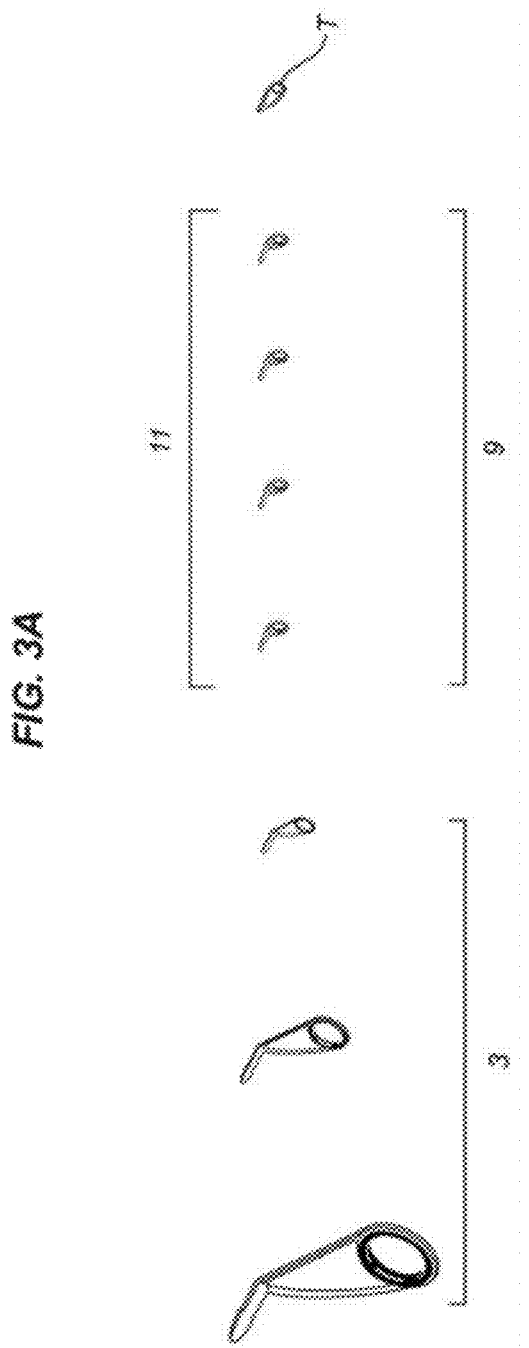

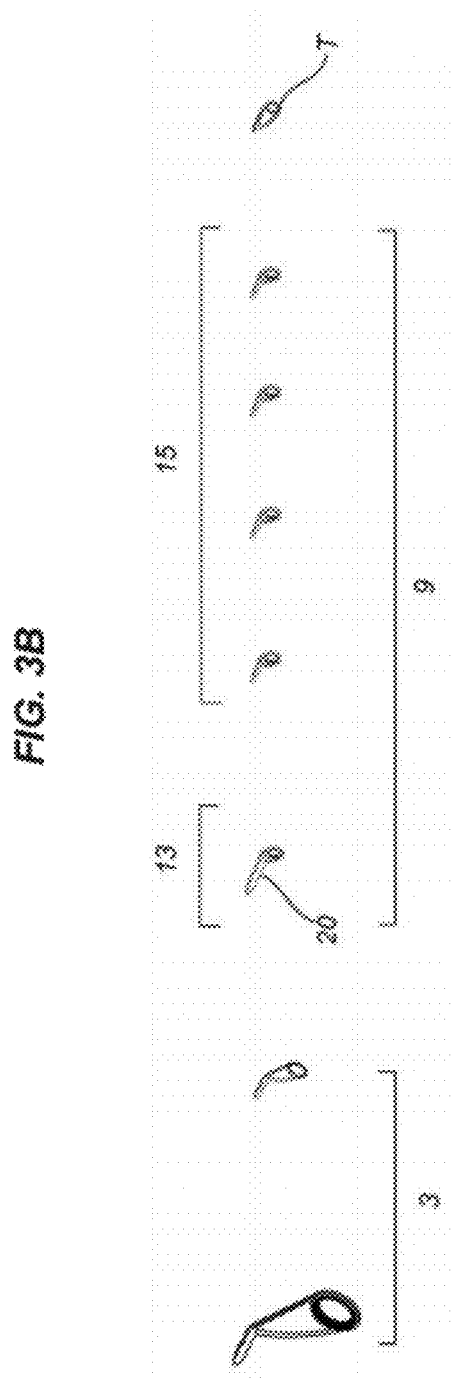

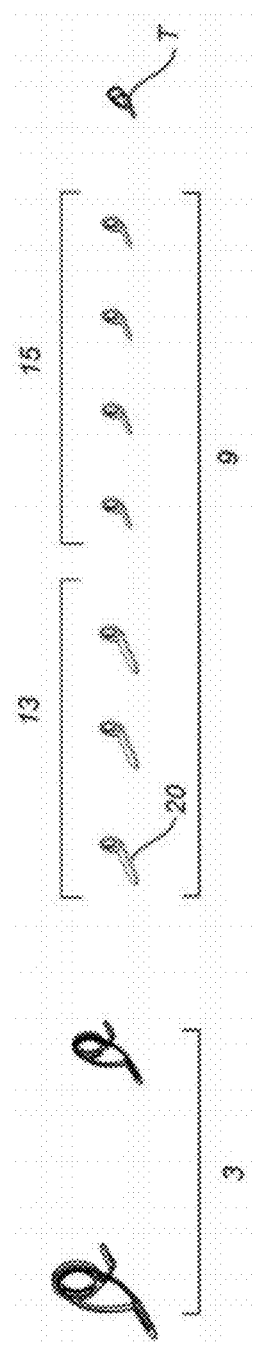

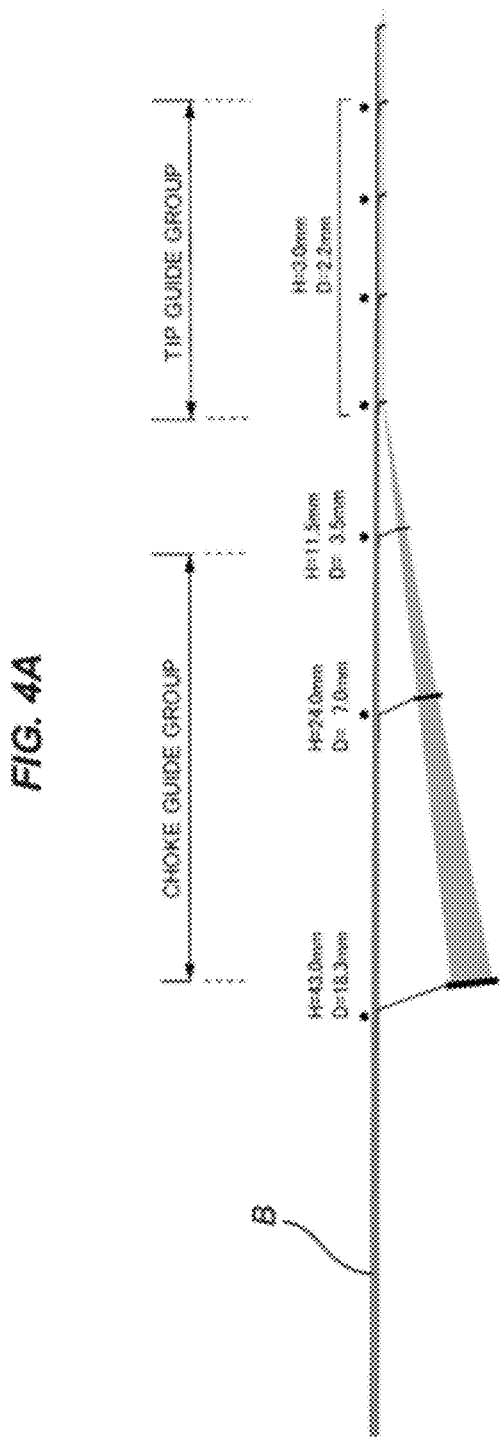

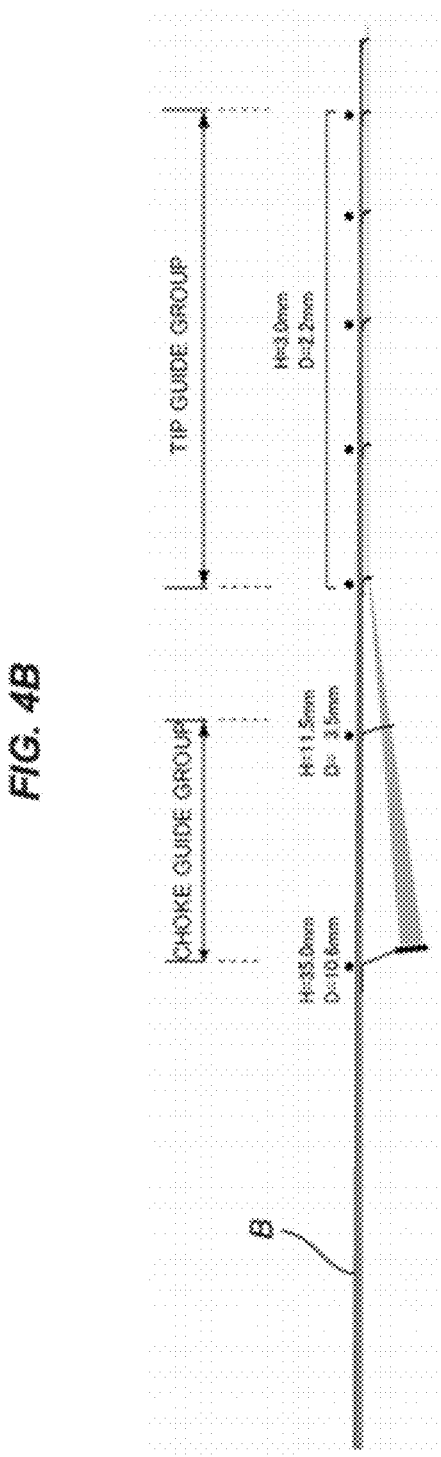

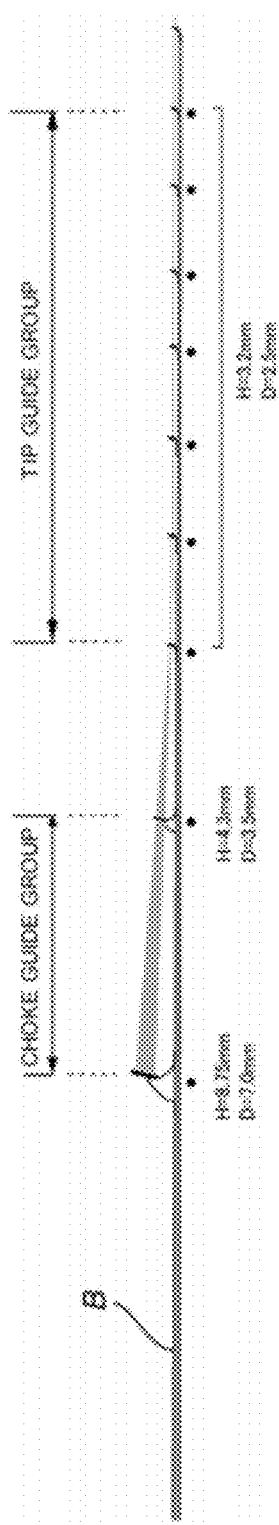

FISHING ROD

BACKGROUND OF THE INVENTION

1. Field of the Invention

The present invention relates to a fishing rod having features in line guide groups.

2. Description of the Conventional Art

In a general fishing rod used by mounting a winding equipment what is called a reel, line guide groups including a plurality of guides are attached between the reel and a top guide with predetermined intervals so as to reasonably transmit a force of a thread (line) to a rod blank, which is a rod body, and naturally bend the rod blank.

As for the guide of the line guide group, from an old time, a height and a diameter gradually decrease toward the top guide side from the reel side. However, it has been formerly pointed out faults that strike sensitivity decreases, there is a holding weight, and further the flying distance of a weight or a lure is not increased at a time of casting.

By contrast, in the fishing rod proposed in Japanese Pat. No. 2899538, a height and a diameter of the guide also decrease toward the top guide side from the reel side. However, a line guide group is divided into a first intermediate guide group and a second intermediate guide group by bordering an intermediate one guide, wherein the first intermediate guide group is attached between a butt guide on the reel side and the intermediate guide, and the second intermediate guide group is attached between the intermediate guide and the top guide. The guides of the first intermediate guide group mainly function as a choke for converging a line delivered from the reel. Accordingly, the weight of the guides of the second intermediate guide group can be weight-saved and, as a result, the aforementioned faults can be solved to a fair degree.

SUMMARY OF THE INVENTION

However, for a differentiation from other company's merchandises, it is required to bring out more original ability of the rod blank.

The present invention is to solve the aforementioned problem, and an objective of the present invention is to provide a fishing rod capable of solving, at a high level, the aforementioned faults that strike sensitivity decreases, there is a holding weight, and the flying distance of a weight or a lure is not increased, and capable of bringing out more original ability of the rod blank.

Present inventors confirmed that in a fishing rod, when a line delivered from a reel converges once, the converged line extends about linearly. Further, they also confirmed that a merit by particularly weight-saving of the tip guide group side among the line guide groups is lager than a demerit by an increase of convergent resistance when the line pass through the guides. Thus, they found out that the original ability of the rod can be brought out more by using this merit. Accordingly, they found out the following to complete the present invention. That is, the aforementioned problems can be solved when the line guide group is made to be a combination of a choke guide group for converging the lines rapidly and smoothly and a tip guide group configured with the same guides basically having a small diameter and light weight.

According to a first aspect of the present invention, a fishing rod includes a line guide group attached to a rod blank, and the line guide group is for guiding a line delivered from a reel to a top guide. In the fishing rod, the line guide group is classified into a choke guide group configured with a plurality of choke guides of two or three and a tip guide group configured with a plurality of tip guides having a decreased height and a diameter than those of the choke guides. The heights and diameters of the plurality of choke guides are set so as to draw one cone shape in which the diameter of the guides are made to be circumferences. The heights and diameters of the plurality of tip guides are set to be all the same.

According to a second aspect of the present invention, in the fishing rod described in the first aspect, a diameter of a choke guide on the furthest side from the top guide is 1.5 to 6 times to a diameter of the choke guide on the nearest side from the top guide in the choke guide group.

According to a third aspect of the present invention, in the fishing rod described in the first or second aspect, a ring center height from a rod surface of the choke guide on the furthest side from the top guide is 2 to 5 times to the ring center height of the choke guide on the nearest side from the top guide, in the choke guide group.

According to a fourth aspect of the present invention, in the fishing rod described in any of the first to third aspects, each tip guide has an attaching leg to be attached to the rod blank, and one or more tip guides on the choke guide group side have larger width and length of the attaching leg than those of the other tip guides, in the tip guide group.

The fishing rod of the present invention can solve, at a high level, the aforementioned faults that strike sensitivity decreases, there is a holding weight, and the flying distance of a weight or a lure is not increased. Further, the fishing rod can bring out more original ability of the rod blank.

BRIEF EXPLANATION OF DRAWINGS

FIGS. 1A and 1B are side face views of a fishing rod according to an exemplary embodiment of the present invention.

FIGS. 2A and 2B illustrate the orbit of line in the fishing rod in FIGS. 1A and 1B FIGS. 3A to 3C illustrate three examples of a line guide group.

FIGS. 4A to 4C each illustrates a state that the example shown in each of FIGS. 3A to 3C is attached to a rod blank.

DETAILED DESCRIPTION OF PREFERRED EMBODIMENT

A configuration of a fishing rod according to an exemplary embodiment will be described below.

Figure 1B:
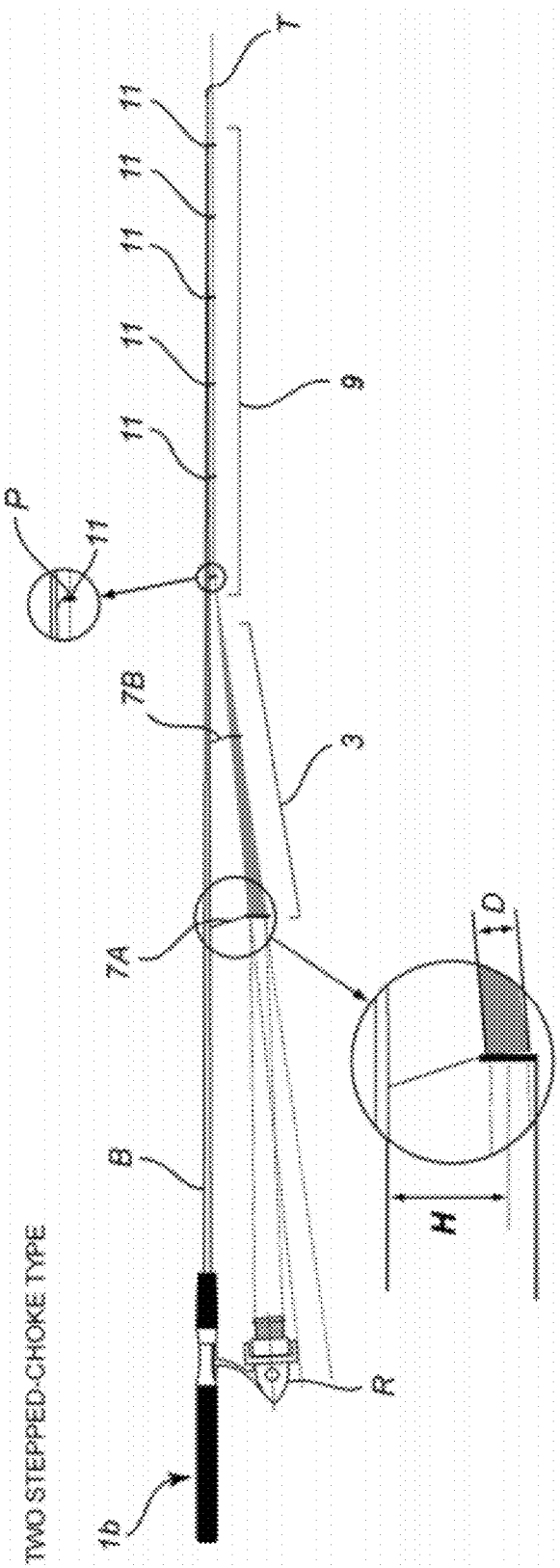

FIGS. 1A and 1B illustrate two kinds of fishing rods 1a and 1b, respectively. In both the fishing rods, a reel R and a top guide T are attached to a rod blank B, and a line guide group is attached between the reel R and the top guide T. The line guide group is classified into a choke guide group 3 and a tip guide group 9, and attached so as to have predetermined intervals between the guides belonging to each group, so that a force of the line is reasonably transmitted to the rod blank B and naturally bends the rod blank B.

The fishing rod 1a is a three stepped-choke type, and the choke guide group 3 is configured with three choke guides 5A, 5B, and 5C. The fishing rod 1 1b is a two stepped-choke type, and the choke guide group 3 is configured with two choke guides 7A and 7B.

In both the three stepped choke type and the two stepped-choke type, a height (H) and a diameter (D) of the choke guide decrease toward the top guide T from the reel R. The choke guides 5A and 7A on the near side to the reel R have the maximum height and diameter, and the choke guides 5C and 7B on the near side to the top guide T have the minimum height and diameter.

In addition, in this specification, the height (H) is a height from an outer peripheral surface of a rod blank to a center of a passing-through opening of a guide.

A plurality of choke guides belonging to the choke guide group 3 is combined so as to draw one virtual cone shape when attaching those to the rod blank B. In the virtual cone shape, each (line passing-through) opening of the choke guides is made to be a circumference of the cone shape, and a top P is placed in or adjacent to the (line passing-through) opening of a tip guide (=a tip guide on the inlet side) which is placed at a portion closest to the choke guide group 3 among tip guides belonging to the tip guide group 9.

Namely, in the three stepped-choke type, the choke guides 5A, 5B, and 5C are combined so that each diameter of the guides is made to be a large, medium, or small circumference of one virtual cone shape, and a bottom surface of the cone shape is the (line passing-through) opening of the choke guide 5A. Even when the virtual cone shape configured with the three choke guides extends toward the reel R side, the virtual cone shape does not overlap a spool diameter of the reel R and is placed more on the lower end side of a spool of the reel R.

In the two stepped-choke type, the choke guides 7A and 7B are combined so that each diameter of the guides is made to be a large or small circumference of one virtual cone shape. In also the two stepped-choke type, the bottom surface of the cone shape is the (line passing-through) opening of the choke guide 7A.

FIGS. 1A and 1B illustrate an isosceles triangle in which an virtual right circular cone shape is projected. In both the three stepped-choke guides type and the two stepped-choke guides type, a vertex P of the isosceles triangle (=a vertex of the cone shape) is placed in the (line passing-through) opening of the tip guide on the inlet side of the tip guide group 9. The vertex P of the triangle is a position where converging of the line is scheduled to end.

For reasonably transmitting a force of a line to the rod blank B, a range of an attachment interval of each choke guide is determined depending on a kind and a length of the fishing rod 1 (1a; 1b), and the virtual cone shape is drawn within the range. Thus, the dimensional relationship between the height (H) and the diameter (D) of the choke guides to be combined is limited within the range.

In the choke guide group 3, the diameters (D) of the choke guides 5A and 7A on the furthest side from the top guide T are set to be 1.5 to 6 times to the diameters (D) of the choke guides 5C and 7B on the nearest side from the top guide T. When the choke guide group 3 is classified depending on purposes, the diameters (D) are set to be 1.5 to 3 times for a bait casting rod, and are set to be 2 to 6 times for a spinning rod. In such setting values, the line can be converged rapidly and smoothly.

As for the difference of the size range, the line is delivered in a waveform from the reel in the choke guide group 3 in the bait casting rod. By contrast, the line is delivered spirally from the reel in the choke guide 3 in the spinning rod. Thus, the convergent resistance of the line in the spinning rod is higher than the convergent resistance of the lines in the bait casting rod.

Even when the diameters (D) of the choke guides 5A and 7A increase up to the aforementioned range, the fishing rod of the present exemplary embodiment more rapidly chokes than the fishing rod disclosed in Japanese Pat. No. 2899538 since the choke guide group 3 is configured with less number of the choke guides. Although the convergent resistance of the line at a time of passing through the choke guides 5A and 7A becomes higher than those of the butt guide disclosed in Japanese Pat. No. 2899538, the disadvantage of the convergent resistance itself is offset by the effect of weight saving obtained as an entirety.

On the other hand, when the diameters (D) of the choke guides 5A and 7A increase up to the aforementioned range, the convergent resistance can be certainly gained in a permissible range, even when the line is a monofilament line, such as fluorocarbon, nylon, or the like, a multifilament line, and particularly, a line having high specific gravity and a high hardness compared with a PE line.

Further, in the choke guide group 3, the heights (H) of the choke guides 5A and 7A on the furthest side from the top guide T are set to be 2 to 5 times to the heights (H) of the choke guides 5C and 7B on the nearest side from the top guide T. With this configuration, even when the lines have the high specific gravity and the high hardness, it can be avoided to swell the line and generate a line slap. When the line slap is generated, the orbit of the line is distorted, so that the convergent resistance also becomes high. However, when the heights (H) are within the aforementioned range, generating the line slap can be prevented certainly.

The line slap means a phenomenon that the line before passing through the guide slaps the rod blank. In the conventional guide setting described in Japanese Pat. No. 2899538, the choke guide group is configured with an isosceles triangular shape in which a spool diameter of the reel R is a bottom line, for realizing a smooth line choke. However, in this setting, when the specific gravity of the line is high or the hardness of the line is high, the line slap is generated easily around guides closest to the reel.

In the tip guide group 9, the height (H) and diameter (D) of each tip guide is smaller than those of the choke guide group 3.

A plurality of tip guides of the tip guide group 9 is set to have the same height (H) and the same diameter (D). The tip guide group 9 usually is a combination of the all same tip guides 11, or a combination of one tip guide 13 nearest to the reel R and the other tip guides 15 as illustrated in FIGS. 3A to 3C and FIGS. 4A to 4C which will be mentioned below. Although the tip guide 13 has the same diameter and height as those of the tip guide 15, the width and length of the attaching leg 20 are larger than those of the tip guide 15. The reason why the tip guide 13 is made to be more rigid than the tip guide 15 is as follows. That is, a load on the guide attached to the fishing rod increases as going toward the butt from the tip of the rod, and the load on a tip guide (the tip guide 13) nearest to the reel R is higher than a tip guide (the tip guide 15) nearest to the top guide T, so that deforming or falling may occur.

In addition, the number of the tip guide 13 changes with the length or a tune of the fishing rod, and more than one tip guide 13 may be necessary.

The fishing rod disclosed in Japanese Pat. No. 2899538, the heights and diameters of the tip guides of the tip guide group gradually decrease. However, since the line extends linearly after the line is converged once, there is no problem even if all of the tip guides are set to have the same height and the same diameter by using only the tip guide 11. However, when the fishing rod is long or has a hard tune, falling or deforming the guide can be certainly reduced by combining the tip guide 13 and the tip guide 15.

For reasonably transmitting the force of a line to the rod blank B, the ranges of the number of each tip guide and the attachment intervals are determined depending on a kind of the fishing rod 1 (1a; 1b). Thus, the positional relationship between the tip guide 11, 13, and 15 are limited in the ranges.

In the fishing rod 1 (1a; 1b), the top side of the choke guide group 3 includes the tip guide group 9. In tip guide group 9, tip guides, which are adjacent to the top guide T and have the smallest diameter to be weight-saved, are disposed. Therefore, the total weight of the fishing rod 1 (1a; 1b) is remarkably reduced.

Further, when the line has high specific gravity and high hardness, the line swells to easily generate the line slap. However, in the fishing rod of the present exemplary embodiment, generation of the line slap can be prevented.

Figure 2B:
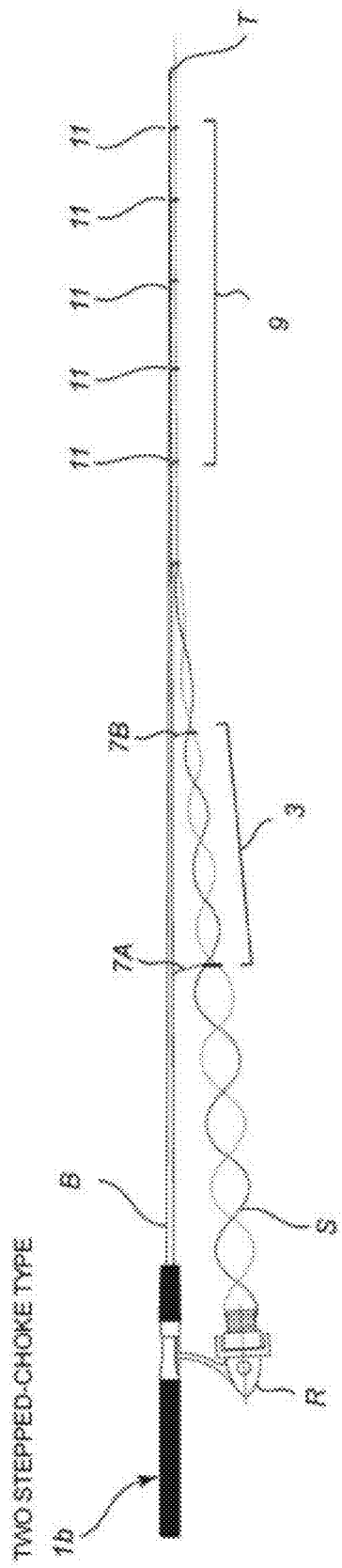

FIGS. 2A and 2B illustrate the orbits in the three stepped-choke type and the two stepped-choke type, respectively. In the three stepped-choke type, it is assumed that a line S is a nylon or fluorocarbon monofilament line having high specific gravity and high hardness. In the two stepped-choke type, it is assumed that the line S is a line having low specific gravity and soft hardness, e.g., a PE line.

When the line S has high specific gravity and high hardness, the line S delivered from the reel R swells greatly, and draws a loop in a spiral or a wave form. However, since the height (H) of the choke guide 5A is enough as mentioned above, the line slap illustrated in a round frame is not generated. Further, the choke guide 5A is a butt guide, and a ring diameter after passing though the choke guide 5A is smaller than the conventional one. Thus, the line is converged quickly, and the loop becomes small.

Accordingly, energy loss can be suppressed to the minimum, and the tip guide can have a small diameter. As a result, since the tip part is weight-saved, a swing speed of the fishing rod at a time of casing can increase, and repulsive force of the fishing rod can increase.

On the other hand, when the line S has low specific gravity and is soft, the line S delivered from the reel R swells a little, and draws the loop in the spiral or wave form. However, the degree of the swelling is smaller than that of the monofilament line. Furthermore, since the line S is soft and has low convergent resistance, the line S can be converged completely in the two stepped choke.

As a result, the weight of the fishing rod can be reduced more and the flying distance can increase more in the two stepped choke, comparing with the three stepped choke.

When the line S has low specific gravity and is soft, swelling of the loop in the spiral or wave form is small, so that the choke guide through which the line S delivered from the reel R passes first can be small to some extent. Thus, the two stepped-choke is desirable. However, regardless of a kind of the line S, the three stepped-choke type is preferable when the fishing rod is used generally.

FIGS. 3A to 3C illustrate examples of the line guide group having a combination based on the aforementioned bases. FIGS. 4A to 4C illustrate fishing rods to which the line guide groups illustrated in FIGS. 3A to 3C are attached.

FIG. 3A and FIG. 4A illustrate the three stepped-choke type for a spinning rod. The three stepped-choke type can generally use from the monofilament line to the PE line regardless of a kind of a line.

FIG. 3B and FIG. 4B illustrate the two stepped-choke type which is particularly proper for a spinning rod using the PE line. In these examples, one tip guide 13, which has an attaching leg 20 having a larger width and a length than the tip guide 15, is combined. The reason of this is as follows. That is, the range of the tip guide group 9 expands because of taking the two stepped-choke type, comparing with FIG. 3A and FIG. 4B, and high load is applied to the guide near to the reel R. Thus, the tip guide basically developed to be attached to a thin tip part has insufficient rigidity, so that deforming or falling may be caused.

FIG. 3C and FIG. 4O illustrate the two stepped-choke type particularly for a bait casting rod.

In the bait casting rod, the guide is attached upward to the rod blank and used unlike the spinning rod.

Accordingly, when a rod is twisted, high transverse load is easily applied to an intermediate part of the rod (which is a so-called belly part). Therefore, in these examples, three tip guides 13, each of which having the attaching leg 20 with larger width and length than the tip guide 15, are combined to solve this problem. Comparing with the conventional guide setting, the tip guide 13 has the same diameter and height as the tip guide 15, and only the width and length of the attaching leg 20 becomes large. Thus, the tip guide 13 has the enough lightweight, and the weight-saving of the tip part which is the objective of the present invention can be realized, solving the problem in insufficient strength.

Accordingly, the exemplary embodiments of the present invention are described, however, a particular configuration of the present invention is not limited in the aforementioned exemplary embodiments, and the designs can be changed within a range not being out of the objective of the present invention.

For example, any of guides belonging to any of the choke guide group and the tip guide group has an inclined single foot. However, the guide can have a combination of an erect-type or a double foot type.

Anyhow, for the guides configuring the present invention, a guide made of a material having a shape which has been conventionally proposed and will be proposed in the future can be used if it satisfies the size relationship in the claims.

What is claimed is:

1. A fishing rod comprising a line guide group attached to a rod blank and guiding a line delivered from a reel to a top guide,
    wherein the line guide group is classified into a choke guide group configured with a plurality of choke guides of two or three and a tip guide group configured with a plurality of tip guides having a decreased height and diameter than the choke guides,
    wherein in the choke guide group, a ring center height from a rod surface of the choke guide on the furthest side from the top guide is 2 to 5 times to a ring center height of a choke guide on the nearest side from the top guide,
    wherein the heights and diameters of the plurality of choke guides are set so as to draw one virtual cone shape in which the diameters are made to be circumferences,
    wherein in the virtual cone shape, a surface on which the rod is seen horizontally is a projected surface, the vertex of an isosceles triangle made by projecting the rod is located in or near the tip guide on the inlet side of the tip guide group, and the bottom extended on the reel side does not overlap a spool diameter of the reel and is off to the direction departing from the rod; and
    wherein the heights and diameters of the plurality of tip guides are set to be all the same.

2. The fishing rod according to claim 1, wherein, in the choke guide group, the diameter of a choke guide on the furthest side from the top guide is 1.5 to 6 times to the diameter of the choke guide on the nearest side from the top guide.

3. The fishing rod according to claim 2, wherein a ring center height from a rod surface of the choke guide on the furthest side from the top guide is 2 to 5 times to the height of the choke guide on the nearest side from the top guide in the tip guide group.

* * * * *